US007123884B2

(12) United States Patent
Nakakubo et al.

(10) Patent No.: US 7,123,884 B2
(45) Date of Patent: Oct. 17, 2006

(54) RF SWITCH

(75) Inventors: Hideaki Nakakubo, Kyoto (JP); Tomoyuki Iwasaki, Kyoto (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 546 days.

(21) Appl. No.: 09/979,154

(22) PCT Filed: Feb. 28, 2001

(86) PCT No.: PCT/JP01/01492

§ 371 (c)(1),
(2), (4) Date: Jan. 23, 2002

(87) PCT Pub. No.: WO01/73885

PCT Pub. Date: Oct. 4, 2001

(65) Prior Publication Data

US 2002/0158705 A1 Oct. 31, 2002

(30) Foreign Application Priority Data

Mar. 27, 2000 (JP) ............................... 2000-86150

(51) Int. Cl.
*H04B 1/44* (2006.01)
*H04B 1/46* (2006.01)
*H01P 1/10* (2006.01)
*H01P 3/08* (2006.01)

(52) U.S. Cl. ........................... 455/81; 455/78; 455/79; 455/80; 455/82; 455/83; 333/103; 333/104; 333/124; 333/127; 333/128

(58) Field of Classification Search .................. 455/78, 455/80–83; 333/104, 103, 124, 127, 128
See application file for complete search history.

(56) References Cited

U.S. PATENT DOCUMENTS 4,371,853 A * 2/1983 Makimoto et al. .......... 333/204
4,506,241 A * 3/1985 Makimoto et al. .......... 333/222
5,442,812 A * 8/1995 Ishizaki et al. ............... 455/82
5,499,000 A * 3/1996 Morikawa et al. .......... 333/104
5,507,011 A * 4/1996 Chigodo et al. .............. 455/82
5,559,485 A * 9/1996 Matsuo et al. .............. 333/222
5,678,199 A * 10/1997 Birth et al. ................... 455/80
5,767,755 A * 6/1998 Kim et al. .................. 333/101
6,308,051 B1 * 10/2001 Atokawa ..................... 455/78
6,833,773 B1 * 12/2004 Tsukamoto et al. ......... 333/134

FOREIGN PATENT DOCUMENTS

EP 0 820 155 1/1998
EP 0921642 6/1999

(Continued)

OTHER PUBLICATIONS

Patent Abstracts of Japan, vol. 1999, No. 01, Jan. 29, 1999 & JP 10 284901 A (Mitsubishi Electric Corp) Oct. 23, 1998, Abstract.

(Continued)

*Primary Examiner*—Matthew D. Anderson
*Assistant Examiner*—Yuwen Pan
(74) *Attorney, Agent, or Firm*—Wenderoth, Lind & Ponack, L.L.P.

(57) ABSTRACT

A radio frequency (RF) switch which is used in an RF unit of a communication apparatus and which has less of an insertion loss during a transmission. A strip line disposed in the RF switch is formed by combining first and second strip lines having different values of characteristic impedance from each other.

8 Claims, 5 Drawing Sheets

FOREIGN PATENT DOCUMENTS

| | | |
|---|---|---|
| JP | 59-147347 | 10/1984 |
| JP | 10-135703 | 5/1998 |
| JP | 10-284920 | 10/1998 |
| JP | 11-017410 | 1/1999 |
| JP | 11-027177 | 1/1999 |

OTHER PUBLICATIONS

Patent Abstracts of Japan, vol. 010, No. 197 (E-418), Jul. 10, 1986) & JP 61 039701 A (Nec Corp) Feb. 25, 1986, Abstract.

Patent Abstracts of Japan, vol. 014, No. 463 (E-0988), Oct. 8, 1990 & JP 2 189001 A (Nec Corp) Jul. 25, 1990, Abstract.

Petrenko V P: "Design of a Broadband Microwave Switch*", Telecommunications and Radio Engineering, US, Begell House, Inc., New York, NY, vol. 44, No. 12, Dec. 1, 1989, pp. 75-77, XP000222638, ISSN: 0040-2508, p. 75, lines 11-16, Figure 1.

* cited by examiner

RF SWITCH

TECHNICAL FIELD

The present invention relates to a radio frequency (RF) switch used in an RF unit of various communication apparatuses.

BACKGROUND ART

A conventional radio frequency (RF) switch for switching an antenna over a transmitting circuit and a receiving circuit is descried in Japanese Patent Laid Open No. 7-312568. FIG. 5 illustrates an equivalent circuit of the conventional RF switch. As shown in FIG. 5, a diode 524 is coupled between an antenna 501 and a transmitting circuit 502, and a strip line 540 is coupled between the antenna 501 and a receiving circuit 503. The anode of a diode 546 is coupled to the strip line 540 at the receiving circuit 503 side, and the cathode of the diode 546 is grounded. A control voltage circuit 530 is coupled to the anode of the diode 524.

When a signal is received, namely, when the diodes 524, 546 are both turned off, a capacitor between both ends of the diode 546 decreases a characteristic impedance of the strip line 540 at the receiving circuit 503 side. A compensating capacitor 532 is coupled to the strip line 540 at the antenna 501 side for compensating for the decreasing of the characteristic impedance of the strip line 540.

The compensating capacitor 532 is disposed for the receiving circuit 503. When a signal is transmitted, namely, when the diodes 524, 546 are both turned on, the compensating capacitor 532 becomes an additional capacitor that is added on the signal path between the antenna 501 and the transmitting circuit 502. This increases a loss of the transmitted signal due to inserting the radio frequency switch.

SUMMARY OF THE INVENTION

A radio frequency (RF) switch is provided which causes less of an insertion loss during transmission. A strip line that is disposed in the RF switch is formed by a combination of two strip lines having different characteristic impedances from each other.

DETAILED DESCRIPTION OF THE INVENTION

An exemplary embodiment of the present invention will be described hereinafter with reference to the accompanying drawings.

Figure 1:
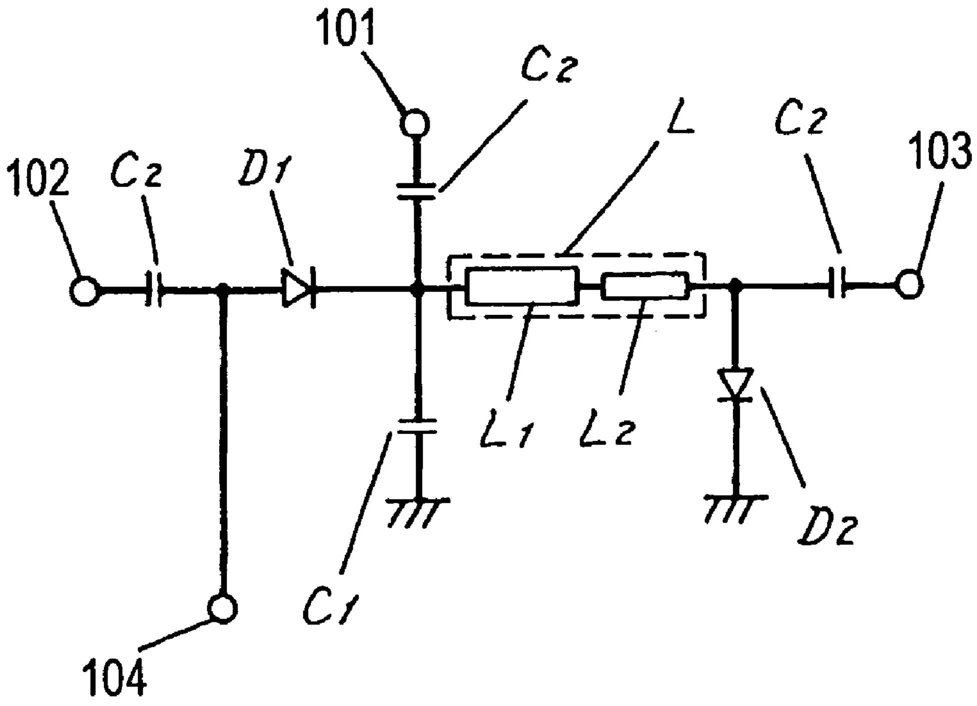
FIG. 1 is an equivalent circuit diagram of a radio frequency (RF) switch in accordance with an exemplary embodiment of the present invention.

FIG. 1 is an equivalent circuit diagram of a radio frequency (RF) switch which is used in an RF unit of a communication apparatus such as a portable telephone. The RF switch is a single-port-double-terminal (SPDT) type RF switch for selectively coupling an antenna 101 to one of a transmitting circuit 102 and a receiving circuit 103.

The RF switch comprises:

(a) a diode $D_1$ of which the anode is coupled to the transmitting circuit 102, and of which the cathode is coupled to the antenna 101;

(b) a controller 104 which is coupled to the anode of diode $D_1$;

(c) a strip line L of substantially one-fourth the /4 wavelength of a transmission frequency in the transmitting circuit 102, wherein one end of the strip line L is coupled to the connection of the diode $D_1$ and the antenna 101, and the other end of the strip line L is coupled to the receiving circuit 103; and (d) a diode $D_2$ of which the anode is coupled to a connection of the strip line L and the receiving circuit 103, and of which the cathode is grounded.

When a signal is transmitted, a positive voltage that is applied from the controller 104 turns on both diodes $D_1$ and $D_2$. Thus, the receiving circuit 103 side of the strip line L is grounded via the turned-on diode $D_2$, and the receiving circuit 103 side that is observed from antenna 101 is opened. In addition, the transmitting circuit 102 is coupled to the antenna 101 via the turned-on diode $D_1$, and the transmitted signal which is fed from the transmitting circuit 102 is thus supplied to the antenna 101.

When a signal is received at the antenna 101, a positive voltage is not applied from the controller 104 to turn off both diodes $D_1$ and $D_2$. Because the turned-off diode $D_1$ disconnects the antenna 101 to the transmitting circuit 102, the received signal which is fed from the antenna 101 is supplied to the receiving circuit 103. When a signal is received, i.e., when the diode $D_2$ is turned off, a capacitor between both ends of the diode $D_2$ makes a characteristic impedance of the strip line L at the receiving circuit 103 side lower than that at the antenna 101 side. A capacitor $C_1$ compensates a balance of the characteristic impedances at both ends of the strip line L.

The strip line L is formed by two, series-interconnected strip lines $L_1$ and $L_2$ having different characteristic impedances from each other. The combination of the characteristic impedances of strip lines $L_1$ and $L_2$ can determine a desired characteristic impedance of the strip line L. Therefore, the balance of the characteristic impedances at both ends of the strip line L is arbitrarily adjusted by determining the characteristic impedances of the strip lines $L_1$ and $L_2$. As a result, the capacitance of the compensating capacitor $C_1$ can be set to a value which is suitable for a transmission path during the transmission. Further, an insertion loss of the RF switch during the transmission is thus suppressed.

For example, when the strip lines $L_1$ and $L_2$ are combined, and when the capacitance of the compensating capacitor $C_1$ is adequately selected, the capacitor $C_1$ can cancel an inductance of the diode $D_1$, where the inductance is contained in the transmission path during the transmission.

The capacitor $C_1$ also prevents the capacity between the ends of the diode $D_1$ from decreasing the characteristic impedance of the strip line L at the receiving circuit 103 side when the diode $D_2$ is turned off during the reception of a signal. When the characteristic impedance of the strip line $L_2$ at the receiving circuit 103 side is set higher than the characteristic impedance of the strip line $L_1$ at the antenna 101 side, the capacitance of capacitor $C_1$ can be reduced.

When the characteristic impedance of the strip line $L_1$ is particularly set to substantially 50 ohms, the compensating capacitor $C_1$ can be omitted.

When the characteristic impedance of the strip line $L_2$ is set higher than the characteristic impedance of the strip line $L_1$, the strip line L has a stepped impedance resonator (SIR) structure whose one end is short-circuited during the transmission. Therefore, a solid line length of the strip line L is extremely reduced, the receiving path during the reception is shortened, and the insertion loss of the RF switch during the reception is accordingly suppressed.

Capacitors $C_2$ at the respective ends of the antenna 101, the transmitting circuit 102, and the receiving circuit 103 cut a direct current (DC) component of the positive voltage that is applied from the controller 104.

Figure 2:
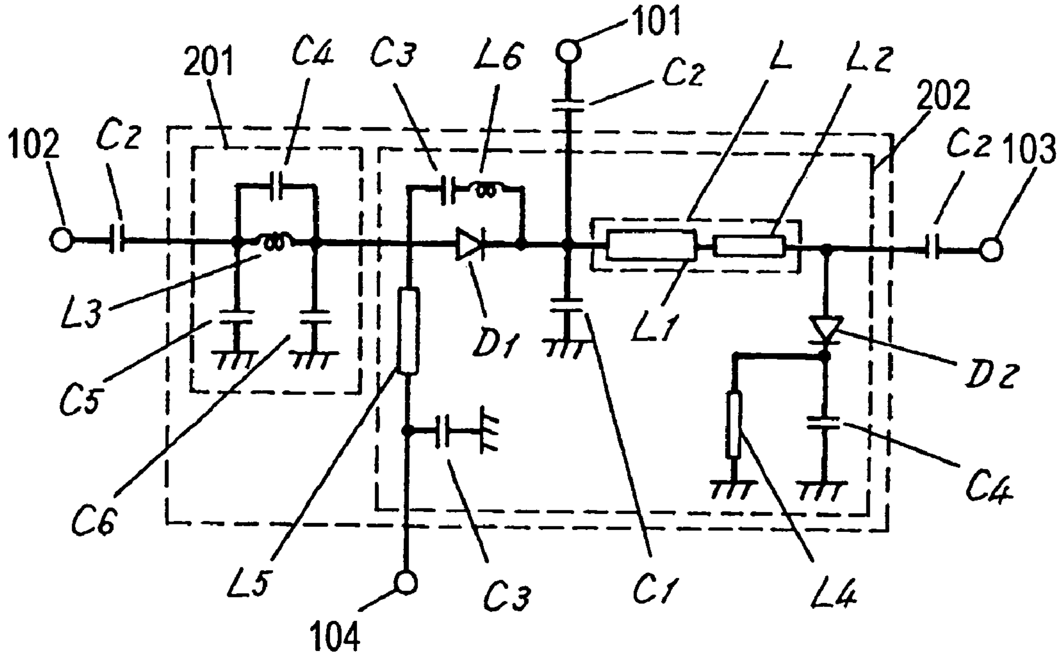
FIG. 2 is an equivalent circuit diagram of an RF switch module employing the RF switch in accordance with the exemplary embodiment of the present invention.
Figure 3:
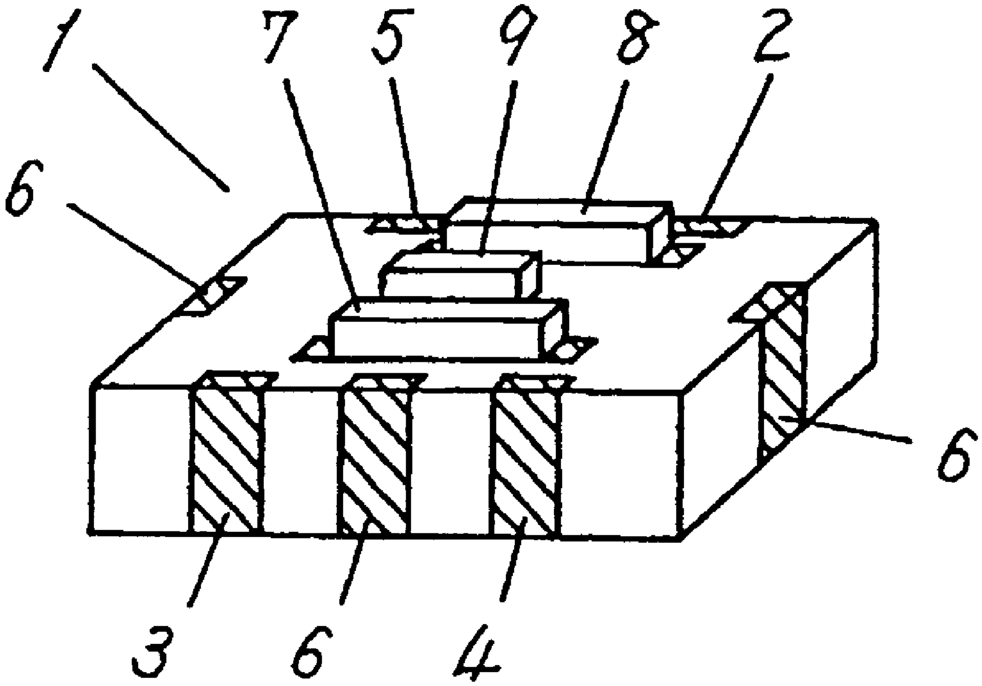
FIG. 3 is a perspective view of a lamination-type RF switch module which is formed by laminating the RF switch modules in accordance with the exemplary embodiment of the present invention.

FIG. 2 is an equivalent circuit diagram of an RF switch module in which a low pass filter (LPF) 201 is coupled to the transmitting circuit side of an RF switch 202 as discussed above. FIG. 3 is a perspective view of a lamination-type RF switch module which is formed by laminating the equivalent circuit of the diagram.

As shown in FIG. 3, the lamination-type RF switch module includes an antenna terminal electrode 2, a transmitting terminal electrode 3, a receiving terminal electrode 4, a control voltage terminal electrode 5, and a grounding terminal electrode 6 disposed in the outer side-surfaces of the layered body 1 which is made of dielectrics. Chip diodes 7, 8 and a chip inductor 9 are disposed on the upper surface of layered body 1.

Figure 4:
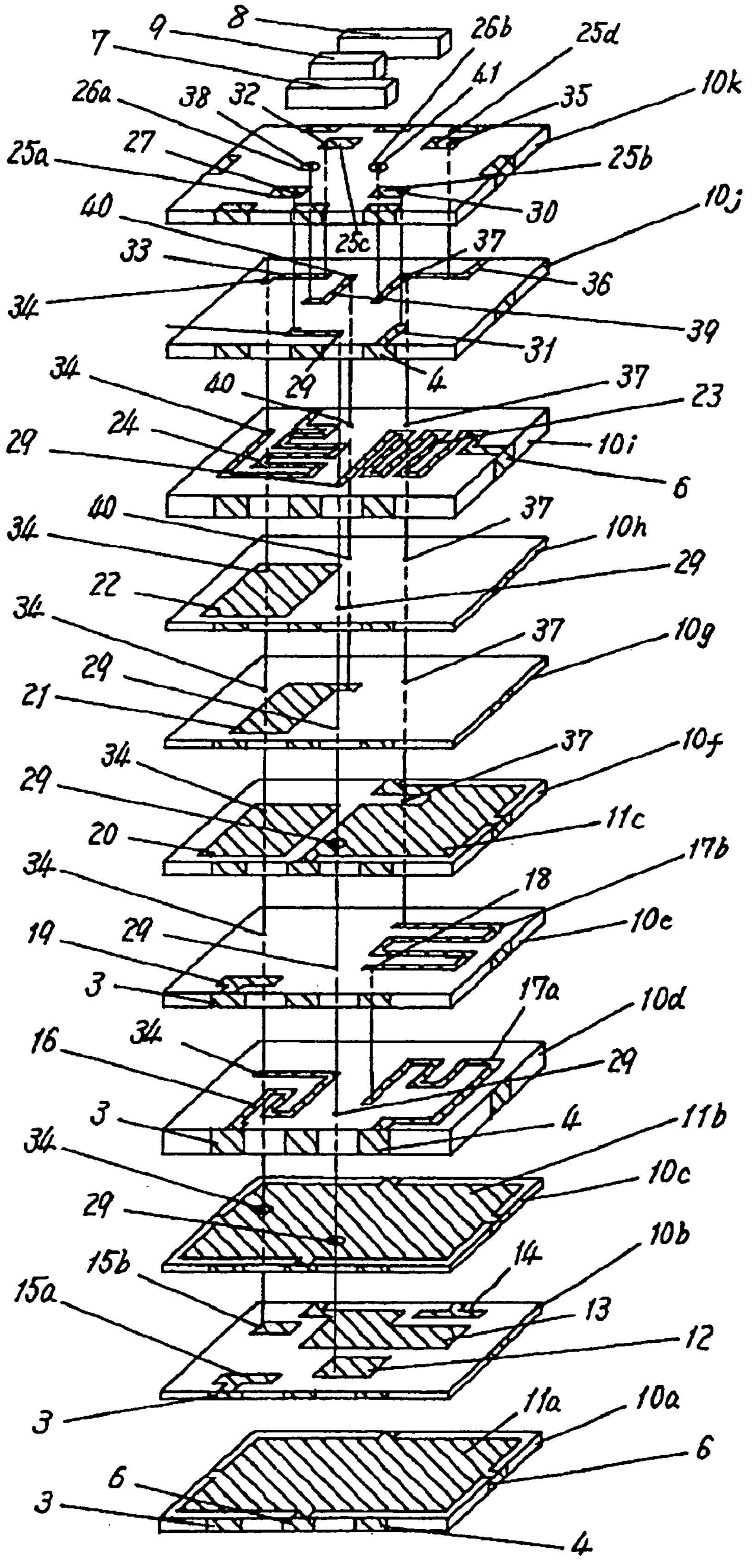
FIG. 4 is an exposed perspective view of the lamination-type RF switch module shown in FIG. 3.
Figure 5:
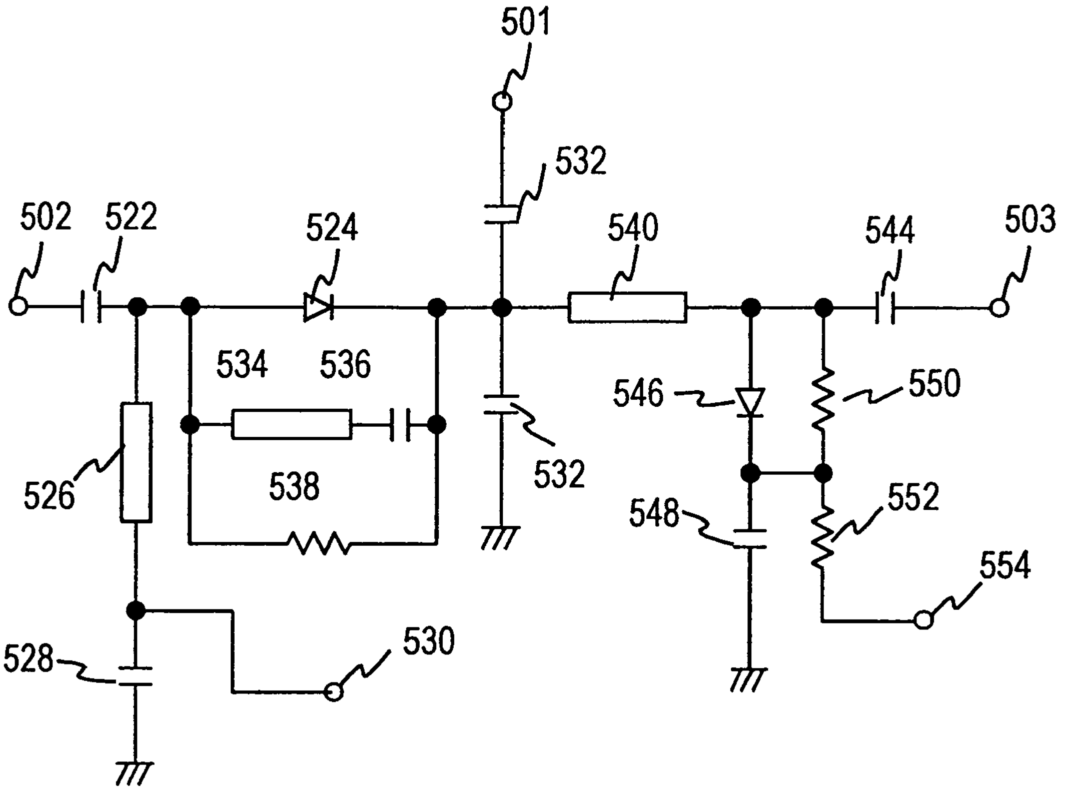
FIG. 5 Prior Art
FIG. 5 is an equivalent circuit diagram of a conventional RF switch.

The layered body 1, as shown in FIG. 4, comprises dielectric sheets 10*a* –10*k*. Grounding electrodes 11*a*, 11*b* are respectively disposed on the substantially entire surfaces of the dielectric sheets 10*a*, 10*c*. A grounding electrode 11*c* is disposed on the right part of the dielectric sheet 10*f*.

Capacitor electrodes 12, 13, 14, 15*a*, 15*b*, which are provided for grounding, are disposed on the dielectric sheet 10*b*. Facing to the grounding electrodes 11*a* and 11*b*, the electrode 12 forms capacitor $C_4$ in FIG. 2, the electrode 13 forms the capacitor $C_3$ in FIG. 2, one of which ends is connected to control voltage terminal electrode 5, the electrode 14 forms the capacitor $C_1$ in FIG. 2, one of which ends is connected to the antenna terminal electrode 2, the electrode 15*a* forms the capacitor $C_5$ in FIG. 2, and the electrode 15*b* forms the capacitor $C_6$ in FIG. 2, one of which ends is connected to the transmitting terminal electrode 3, respectively.

Strip line 16, as an inductor $L_3$ in FIG. 2, one of which ends is connected to the transmitting terminal electrode 3, and strip line 17*a*, as an inductor $L_2$ in FIG. 2, one of which ends is connected to receiving terminal electrode 4, are disposed on the dielectric sheet 10*d*.

Strip line 17*b*, as an inductor $L_1$ in FIG. 2, one of which ends is connected to a strip line 17*a* through a via hole 18, is disposed on the dielectric sheet 10*e*. Capacitor electrode 19, which forms the capacitor $C_5$ in FIG. 2, one of which ends is connected to the transmitting terminal electrode 3, is disposed at the left side of the strip line 17*b*.

Capacitor electrodes 20, 21, 22 are disposed on the left parts in the dielectric sheets 10*f*, 10*g*, 10*h*. Facing to the electrodes 20 and 22, the electrode 21 forms the capacitor $C_3$ in FIG. 2. Facing to the electrodes 19, the electrode 20 forms the capacitor $C_4$ in FIG. 2.

Strip line 23, which forms the strip line $L_4$ in FIG. 2, one of which ends is connected to grounding terminal electrode 6, is disposed on the dielectric sheet 10*i*. Strip line 24, which forms the strip line $L_5$ in FIG. 2, one of which ends is connected to the control voltage terminal electrode 5, is disposed at the left side of the strip line 23.

Mounting electrodes 25*a*, 25*b*, 25*c*, 25*d* for mounting chip diodes 7, 8 and mounting electrodes 26*a*, 26*b* for mounting chip inductor 9 are formed on the dielectric sheet 10*k*.

The mounting electrode 25*a* side of the chip diode 7, diode $D_2$ in FIG. 2, is coupled to the connection electrode 28 through the via hole 27, and to the strip line 23 and the capacitor electrode 12 through the via hole 29. The mounting electrode 25*b* side of chip diode 7 is coupled to the receiving terminal electrode 4 through the via hole 30 and the connection electrode 31.

The mounting electrode 25*c* side of the chip diode 8, diode $D_1$ in FIG. 2, is coupled to the connection electrode 33 through the via hole 32, and to the strip line 24, the capacitor electrode 22, the capacitor electrode 20, the strip line 16, and the capacitor electrode 15*b* through the via hole 34. The mounting electrode 25*d* side of the chip diode 8 is coupled to the antenna terminal electrode 2 through the via hole 35 and the connection electrode 36. The electrode 36 is coupled to an end of the strip line 17*b* through via the hole 37.

The mounting electrode 26*a* side of the chip diode 9, inductor $L_6$ in FIG. 2, is coupled to the connection electrode 39 through the via hole 38, and to the capacitor electrode 21 through the via hole 40. The mounting electrode 26*b* side of the chip diode 9 is coupled to the antenna terminal electrode 2 through the via hole 41 and the connection electrode 36.

A respective thickness of the dielectric sheets 10*f*, 10*d* which are shown in FIG. 4 differs from each other so as to make a respective characteristic impedance of the strip lines $L_1$ and $L_2$ differ from each other. Strip line 17*a*, strip line $L_1$ in FIG. 2, is disposed on the lower surface of the dielectric sheet 10*f*, and the grounding electrode 11*c* is disposed on the upper surface of the dielectric sheet 10*f*. Strip line 17*b*, strip line $L_2$ in FIG. 2, is disposed on the upper surface of the dielectric sheet 10*d*, and the grounding electrode 11*b* is disposed on the lower surface of the dielectric sheet 10*d*. The characteristic impedance of the strip line 17*a* is determined by an interval between the strip line 17*a* and the grounding electrode 11*b*, and the characteristic impedance of strip line 17*b* is determined by an interval between the strip line 17*b* and the grounding electrode 11*c*. Accordingly, a desired characteristic impedance of each of the strip lines 17*a* and 17*b* can be obtained by adjusting the thickness of each of the dielectric sheets 10*d* and 10*f*.

Actually, the thickness of the dielectric sheet 10*f* is made thinner than the thickness of the dielectric sheet 10*d*, and the characteristic impedance of strip line 17*a* is accordingly set higher than the characteristic impedance of the strip line 17*b*. As discussed above, the capacitance of the correcting capacitor $C_1$ can be reduced, and an insertion loss of the RF switch during the transmission is thus suppressed.

The characteristic impedances of the strip lines 17*a*, 17*b* differing from each other are also obtained by making the line widths thereof different from each other. The same effect can be obtained by forming the strip lines 17*a*, 17*b* on a common layer, e.g., the dielectric sheet 10*d*, and changing the line width in a single strip line such as the strip line 17*a* at the intermediate portion of the single strip line. Also, a combination of the changing of the line width and the differing of the thickness of the dielectric sheets 10*d*, 10*f* can adjust the characteristic impedance.

The strip lines 17*a*, 17*b* are connected through the via hole 18. Because the electric characteristic of the via hole 18, namely, Q value, is higher than electric characteristic of an electrode pattern or the like that is formed on side surfaces of the layered product, the increasing of the insertion loss of the RF switch at this part is suppressed.

INDUSTRIAL APPLICABILITY

The present invention relates to a radio frequency (RF) switch which is used in an RF unit of various communication apparatuses and provides the RF switch with a less insertion loss during a transmission. The RF switch includes a strip line that is formed by combining two strip lines having different characteristic impedances.

The invention claimed is:

1. A radio frequency switch for coupling an antenna selectively to one of a transmitting circuit and a receiving circuit, comprising:

a first diode coupled between the antenna and the transmitting circuit;

a strip line coupled between the antenna and the receiving circuit;

a second diode coupled between the receiving circuit and a ground; and a controller for controlling said first and second diodes to be turned on or off;

wherein said strip line includes a first strip line having a first end and a second end, said first end of said first strip line being connected with the antenna, and a second strip line having a first end and a second end, said first end of said second strip line being connected with said second end of said first strip line, and said second end of said second strip line being connected with the receiving circuit; and wherein a characteristic impedance of said second strip line is higher than a characteristic impedance of said first strip line.

2. The radio frequency switch according to claim 1, wherein the characteristic impedance of said first strip line is substantially 50 ohms.

3. A radio frequency switch comprising:

a layered body formed by laminating a plurality of dielectric sheets;

an antenna terminal electrode disposed on an outer surface of said layered body;

a transmitting terminal electrode disposed on the outer surface of said layered body;

a receiving terminal electrode disposed on the outer surface of said layered body;

a grounding electrode disposed in said layered body;

a first diode disposed on said layered body and coupled between said antenna terminal electrode and said transmitting terminal electrode;

a strip line disposed in said layered body and coupled between said antenna terminal electrode and said receiving terminal electrode; and a second diode disposed on said layered body and coupled between said receiving terminal electrode and said grounding electrode;

wherein said strip line includes a first strip line having a first end and a second end, said first end of said first strip line being connected with the antenna terminal, and a second strip line having a first end and a second end, said first end of said second strip line being connected with said second end of said first strip line, and said second end of said second strip line being connected with the receiving terminal; and wherein a characteristic impedance of said second strip line is higher than a characteristic impedance of said first strip line.

4. The radio frequency switch according to claim 3, wherein line widths of said first and second strip lines differ from each other.

5. The radio frequency switch according to claim 3, wherein said first and second strip lines are respectively disposed on different dielectric sheets of the plurality of dielectric sheets in said layered body.

6. The radio frequency switch according to claim 3, wherein line widths of said first and second strip lines differ from each other, and said first and second strip lines are respectively disposed on different dielectric sheets of the plurality of dielectric sheets in said layered body.

7. The radio frequency switch according to claim 3, wherein an interval between said first strip line and said grounding electrode differs from an interval between said second strip line and said grounding electrode.

8. The radio frequency switch according to claim 3, wherein said first and second strip lines are respectively disposed on different dielectric sheets of the plurality of dielectric sheets in said layered body and coupled to each other through a via hole.

* * * * *